(12) United States Patent
Sivaswamy et al.

(10) Patent No.: US 12,547,869 B2
(45) Date of Patent: Feb. 10, 2026

(54) AI-BASED PRESENTER SELECTION FOR WEB CONFERENCE

(71) Applicant: INTERNATIONAL BUSINESS MACHINES CORPORATION, Armonk, NY (US)

(72) Inventors: Hemant Kumar Sivaswamy, Pune (IN); Sri Harsha Varada, Vizianagaram (IN); Ramesh Naidu Yamalapalli, Visakhapatnam (IN); Tirumala Vasu Padisetti, Visakhapatnam (IN)

(73) Assignee: International Business Machines Corporation, Armonk, NY (US)

(*) Notice: Subject to any disclaimer, the term of this patent is extended or adjusted under 35 U.S.C. 154(b) by 583 days.

(21) Appl. No.: 17/643,078

(22) Filed: Dec. 7, 2021

(65) Prior Publication Data

US 2023/0177305 A1 Jun. 8, 2023

(51) Int. Cl.
*G06N 3/006* (2023.01)
*H04L 65/403* (2022.01)

(52) U.S. Cl.
CPC ........... *G06N 3/006* (2013.01); *H04L 65/403* (2013.01)

(58) Field of Classification Search
CPC .......... G06F 3/03; G06F 3/038; G06F 3/0487; G06F 1/16; G06F 3/00; G06F 3/01; G06F 15/16; G06F 18/22; G06F 3/0481; G06F 40/18; G06F 15/173; G06F 3/041; G06F 3/0484; G06F 3/14; G06F 3/16; G06F 40/00; G06F 40/106; G06F 13/00; G06F 15/00; G06F 3/048; G06F 3/0482; G06F 3/0488; G06F 40/197; G06Q 10/06; G06Q 10/10; G06Q 10/02; G06Q 30/02
See application file for complete search history.

(56) References Cited

U.S. PATENT DOCUMENTS

| | | |
|---|---|---|
| 6,963,353 B1 | 11/2005 | Firestone |
| 8,218,458 B2 | 7/2012 | Flynn |
| 8,626,847 B2 | 1/2014 | Jones |
| 9,137,187 B1 | 9/2015 | Goepp |
| 10,623,700 B2 * | 4/2020 | Gero ..................... H04L 65/403 |

(Continued)

OTHER PUBLICATIONS

Computer-Vision Based Attention Monitoring for Online Meetings (Year: 2022).*

(Continued)

*Primary Examiner* — Rayeez R Chowdhury
(74) *Attorney, Agent, or Firm* — Caleb D. Wilkes

(57) ABSTRACT

A method, computer system, and a computer program product for artificial intelligence-based virtual meeting presentation oversight are provided. A stream of a virtual meeting having a first computer designated for screen sharing control is received. A broadcast hindrance update from the first computer is received. The broadcast hindrance update is input into a machine learning model. As output from the machine learning model a recommendation regarding switching of the screen sharing control is received. In response to the receiving and to the recommendation indicating that the screen sharing control should be switched, a control switching signal is sent to a second computer participating in the virtual meeting.

20 Claims, 6 Drawing Sheets

(56) References Cited

U.S. PATENT DOCUMENTS

2008/0063173 A1 3/2008 Sarkar
2011/0270933 A1* 11/2011 Jones .................. H04L 65/4053
715/753

OTHER PUBLICATIONS

Anonymous, "Keep meetings focused and on track with screen sharing," GoToConnect, Accessed: Sep. 3, 2021, https://www.goto.com/connect/features/screen-sharing#, 11 pages.

Disclosed Anonymously, "Intelligent Line Muting during Conference Call using Cognitive & Contextual Disturbance Techniques," IP.com, IP.com No. IPCOM000246023D, IP.com Electronic Publication Date: Apr. 26, 2016, 3 pages.

Disclosed Anonymously, "System and method for automatic presenter context switching," IP.com, IP.com No. IPCOM000206349D, IP.com Electronic Publication Date: Apr. 19, 2011, 4 pages.

Disclosed Anonymously, "System and method for management of multiple presenters in a single electronic meeting session," IP.com, IP.com No. IPCOM000213126D IP.com Electronic Publication Date: Dec. 5, 2011, 4 pages.

Mell et al., "The NIST Definition of Cloud Computing", National Institute of Standards and Technology, Special Publication 800-145, Sep. 2011, pp. 1-7.

No Author, "Gotomeeting Features Presenter Control in Online Meetings", https://web.archive.org/web/20190905124237/https://www.gotomeeting.com/en-in/features/online-meeting-presenter-control, Sep. 5, 2019, 5 pages.

* cited by examiner

US 12,547,869 B2

AI-BASED PRESENTER SELECTION FOR WEB CONFERENCE

BACKGROUND

The present invention relates generally to web or virtual conferences, to managing the presentation and screen sharing tools for such web or virtual conferences, and to improving the meeting experience of end recipients of the web or virtual conferences.

In screen sharing tools for web or virtual conferences, also known as digital remote meetings or online meetings, the display screen on the meeting presenter/host side displays content and a screen view that are also displayed on the display screen on the client side. Microphones and/or cameras of the participants may in some instances be turned off during the virtual meeting except for the microphone and/or camera of the individual presenter who is currently presenting. This individual presenter may be speaking in reference to certain slides or visual information that is being displayed on the screen and that becomes part of the transmitted meeting for viewing on the computer screens of each of the other meeting participants.

SUMMARY

According to one exemplary embodiment, a computer-implemented method for artificial intelligence-based virtual meeting presentation oversight is provided. A stream of a virtual meeting having a first computer designated for screen sharing control is received. A broadcast hindrance update from the first computer is received. The broadcast hindrance update is input into a machine learning model. As output from the machine learning model a recommendation regarding switching of the screen sharing control is received. In response to the receiving and to the recommendation indicating that the screen sharing control should be switched, a control switching signal is sent to a second computer participating in the virtual meeting. A computer system and a computer program product corresponding to the above method are also disclosed herein.

BRIEF DESCRIPTION OF THE DRAWINGS

These and other objects, features, and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
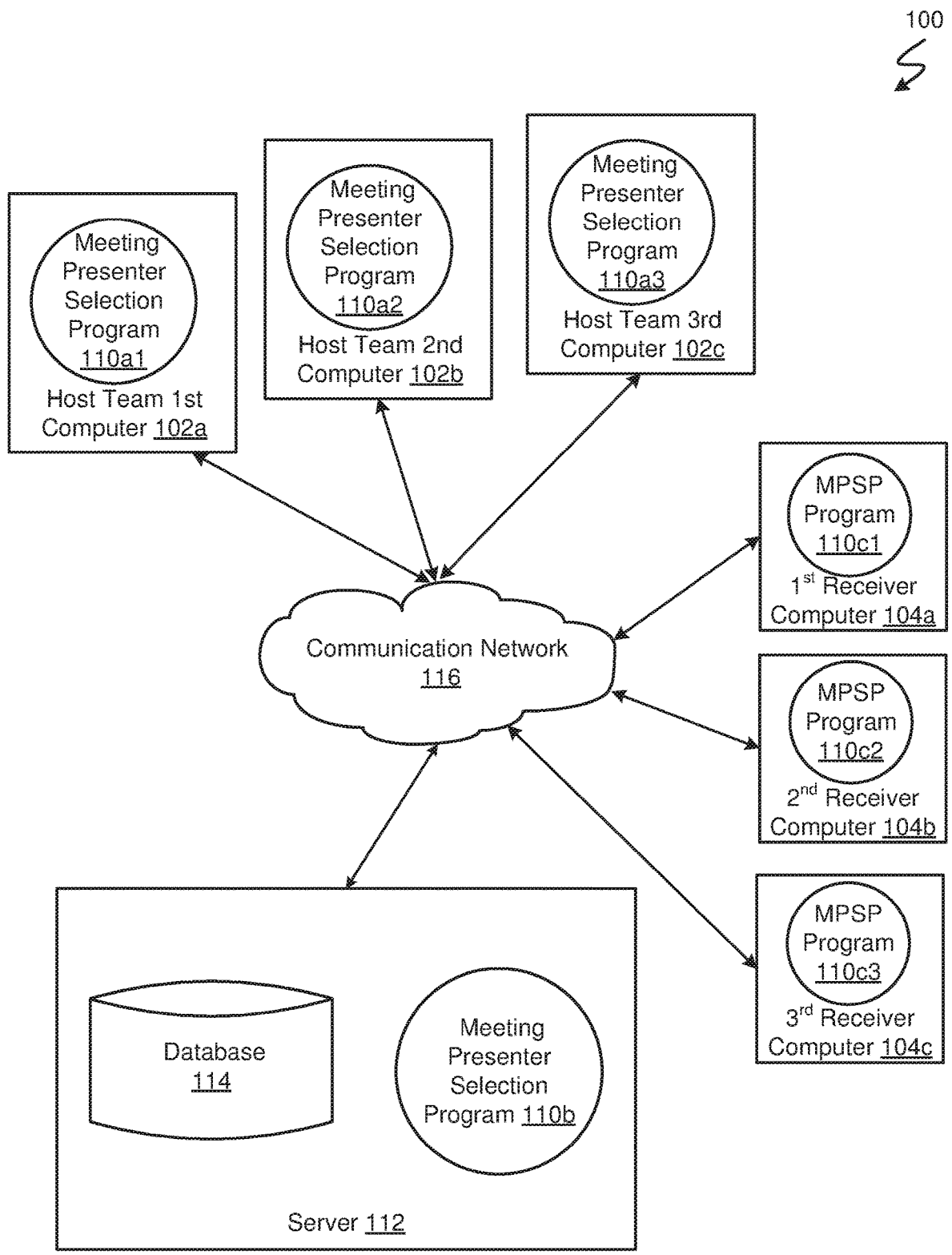
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The following described exemplary embodiments provide a method, computer system, and computer program product for virtual meeting presenter automated selection in virtual meetings to improve the viewing and learning experience of individuals who are receiving the virtual meeting. Business, schools, social groups, etc. are spending more time using virtual meeting tools that allow users at different physical locations to communicate and share information with each other via audio-visual technology, computers, and network communications such as the internet. Presentations, documents, murals, spreadsheets, boards, images, videos, and demonstrations have been used and shared in virtual/web meetings oftentimes with audio commentary being provided therewith. The present embodiments help improve virtual meeting software and, hence, the virtual meetings themselves by allowing the information that is delivered including the live audio and/or visual components that are being transmitted to be sent from one of several computers of a presentation team and namely from a computer which has quality bandwidth and power and a lack of distracting background noise. Thus, with this presenter automated selection the attention of virtual meeting participants/viewers may be more readily captured and the virtual meeting participants/viewers who are watching at end devices may be more readily engaged. Thus, the present embodiments may improve the library of virtual meeting software.

When multiple people are involved in providing a presentation for video web conferencing and when a person of this presenting group is currently presenting from their own computer, due to inadvertent reasons this presenter could face issues hosting the presentation. For example, if the person presenting or speaking is experiencing a loud background noise at their location, e.g., if the sound of drilling from construction occurring at a neighboring house or property is occurring during the virtual meeting time, it could become more difficult for this host team member to present in a way that provides a meeting with good audio clarity for the receiving audience. Meeting participants/clients may, at their own respective computer, have trouble hearing the message being given because the background noise from the presenter computer enters into the streamed audio signal and interferes with the sound coming from the meeting presenter. The virtual meeting presenter automated selection program may analyze this data and similar types of broadcast hindrance data and automatically or semi-automatically switch the meeting presenter controls to another person on the host team. This other person to whom the presentation controls are switched may have currently a broadcast situation that is better than that broadcast situation of the initial presenter. This other person from the host team may be using their computer at a second location that is physically and/or geographically different than the computer that the first presenter was using. Community-, building-, or neighborhood-based broadcast issues, among other reasons, may cause transmission problems for the first computer (of the initial presenter), while at the second computer of the other host team member which is at a different physical location no such transmission problems are occurring According to at least some embodiments of the present disclosure, an AI module which runs on the central web conference application may invoke and/or install agents (software) on all or some of the client machines/computers of the host team. The installed agent monitors certain webcasting/broadcasting factors such as the network bandwidth, battery usage, background noise level in an area immediately surrounding the respective computer, and other parameters identified in a cognitive way that occur on the respective computer of the particular host team member. These variables may differ for the various members of the host team because these members may be located at different locations, e.g., in their respective office, e.g., in homes/offices in different cities, states, and/or countries. Thus, some members may be better situated at a particular day or hour or other time segment from a broadcast, computing, and/or technology basis to be the lead presenter and speaker to present the materials for the virtual meeting. The AI system learns over a period of time other affecting factors that may affect the virtual meeting during a presentation or screen share segment.

In response to determining that the broadcast, computing, and/or technology of the computer of the lead presenter may be hindering the presentation for the virtual meeting, the presenter automated selection program may automatically or semi-automatically and seamlessly transfer the meeting control to another member of the host team with the presentation deck and other supporting files through a seamless package transfer. The AI system through the client agents may in some embodiments constantly monitor the users who have pre-configured. The AI system may choose, amongst the other possible presenters who are currently joined into the virtual meeting, the other team member who would be best suited to take over presenting if the lead presenter has broadcasting difficulties. The AI system may prompt the initially assigned lead presenter and ask the initially assigned lead presenter for consent and/or advice for switching presentation control to another computer. For example, if the analytics of the AI system indicate that two other host team members both could equally succeed if the meeting presentation leadership switched to them, the AI system in some embodiments may generate a graphical user interface prompt to the computer screen of the initial lead presenter that asks the initial lead presenter to choose amongst the other two potential leaders and ask for consent to switch control to the computer of one of the other team members. Such a prompt with a selection of backup presenter may alternatively and/or additionally be generated and presented for another host team member who is acting and registered as an organizer of the web/virtual conference. Thus, in some embodiments consent from the initial lead presenter and/or from another member of the host team may be sought and obtained by the AI system in order to trigger the switching of lead presenter.

Analytics on possible transmission hinderances of the host and remaining participants may in some embodiments be carried out in a continuous way by the automated program. Based on these analytics, the AI system may suggest the best backup host from a list of participants/host team members. Upon selection of a backup presenter, the AI system may notify the selected backup presenter upfront via message generation and transmission. This message may suggest that the chosen first backup be ready to present in case there are considerable broadcast and/or technological hinderances for the initial lead presenter.

The screen transfer from one user to another also may be performed seamlessly by the AI system so that the transfer of state, e.g., the presentation, is carried over. This transfer may involve multiple applications. For example, presentation components such as a slide generation program, a web browser with authorized cookies and a particular web page being opened, and a relational database may be included as part of the seamless transfer of presentation control. The scroll position and zoom level in a screen view, e.g., of a web page, that the current main presenter has generated may, in at least some embodiments, be included as part of a seamless transfer of the presentation materials to the computer of a backup presenter.

Via this automated switching, the other users who are participating in the virtual meeting as listeners/viewers may experience a seamless presentation. This automated meeting oversight may help avoid broadcast problems for the virtual meeting. The automated presenter switching program may perform this help and oversight with minimum or no manual intervention. This oversight may be achieved as artificial intelligence-based peer-to-peer transfer of control and corrective action during a video web conference.

Referring to FIG. 1, a networked computer environment 100 in accordance with one embodiment is depicted. The networked computer environment 100 may include host team computers such as a first, second, and third host team computer 102a, 102b, and 102c, respectively. The networked computer environment 100 may include additional receiver computers such as first, second, and third receiver computers 104a, 104b, and 104c, respectively. The host team computers and the receiver computers may be enabled to run virtual meeting presenter automated selection program 110a1, 110a2, 110a3, 110c1, 110c2, and 110c3, respectively. The networked computer environment 100 may also include a server 112 that is a computer and that is enabled to run virtual meeting presenter automated selection program 110b that may interact with a database 114. The various computers, e.g., the first, second, and third host team computers 102a, 102b, and 102c and the first, second, and third receiver computers 104a, 104b, and 104c, and the server 112 may communicate with each other via a communication network 116. The networked computer environment 100 may include many computers and many servers, although six computers and one server 112 are shown in FIG. 1. The communication network 116 allowing communication between the first, second, and third host team computers 102a, 102b, and 102c, the first, second, and third receiver computers 104a, 104b, and 104c, and the server 112 may include various types of communication networks, such as the Internet, a wide area network (WAN), a local area network (LAN), a telecommunication network, a wireless network, a public switched telephone network (PTSN) and/or a satellite network.

It should be appreciated that FIG. 1 provides only an illustration of one implementation and does not imply any limitations with regard to the environments in which different embodiments may be implemented. Many modifications to the depicted environments may be made based on design and implementation requirements.

The first, second, and third host team computers 102a, 102b, 102c may communicate with each other, with the server 112, and with the first, second, and third receiver computers 104a, 104b, and 104c via the communication network 116. The communication network 116 may include connections, such as wire, wireless communication links, or fiber optic cables. Although one server 112 is shown in the networked computer environment 100 shown in FIG. 1, the communication network 116 may itself include multiple servers such as a network edge server and an edge/gateway server which may be enabled to run or assist in operation of the virtual meeting presenter automated selection and switching. The communication network 116 may in some embodiments be or include high speed networks such as 4G and 5G networks. Implementing the present virtual meeting presenter automated selection and switching embodiments in a 5G network will enable at least some embodiments to be implemented on the edge in order to boost network performance.

Figure 3:
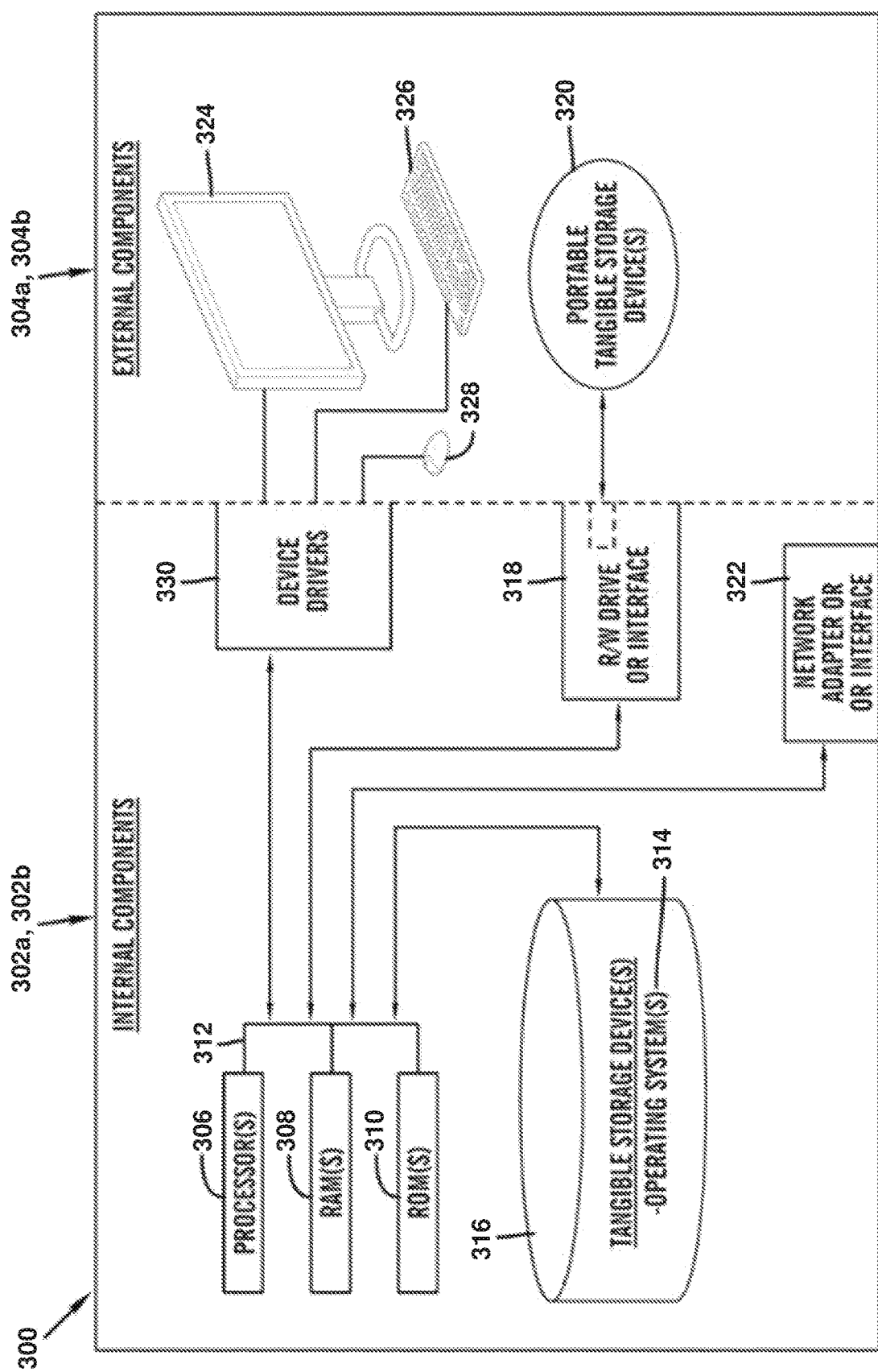
FIG. 3 is a block diagram of internal and external components of computers and servers depicted in FIG. 1 according to at least one embodiment.

As will be discussed with reference to FIG. 3, the server 112 may include internal components 302a and external components 304a, respectively. The first, second, and third host team computers 102a, 102b, and 102c and the first, second, and third receiver computers 104a, 104b, and 104c may also each include internal components 302b and external components 304b as depicted in FIG. 3. Server 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. The first, second, and third host team computers 102a, 102b, and 102c and the first, second, and third receiver computers 104a, 104b, and 104c may each be, for example, a mobile device, a telephone, a personal digital assistant, a netbook, a laptop computer, a tablet computer, a desktop computer, or any type of computing devices capable of running a program, accessing a network, and accessing a database 114 in a server 112 that is remotely located with respect to the first, second, and third host team computers 102a, 102b, and 102c and with respect to the first, second, and third receiver computers 104a, 104b, and 104c. The first, second, and third host team computers 102a, 102b, and 102c may each include a display screen, a speaker, a microphone, a camera, and a keyboard or other input device for better presenting audiovisual material used in virtual meetings and for recording/transmitting audiovisual material to send to others who are participating in a virtual meeting. The first, second and third receiver computers 104a, 104b, 104c may also include the same or similar input devices to allow the participants/end viewers of a virtual meeting to provide feedback to presentations, e.g., to ask live questions during the virtual meeting. According to various implementations of the present embodiment, the virtual meeting presenter automated selection program 110a1, 110a2, 110a3, 110b, 110c1, 110c2, 110c3 may interact with a database 114 that may be embedded in various storage devices, such as, but not limited to a various computers/mobile devices, a server 112 that may be in a network, or another cloud storage service.

Usage of storing content on edge servers may reduce network traffic that is required for execution of a virtual meeting that includes the virtual meeting presenter automated selection described herein. This reduction in network traffic may help achieve efficient processing for execution of the methods according to the present embodiments. As a content deliverer may log into a virtual meeting at one of the first, second, and third host computers 102a, 102b, 102c and as individuals receiving the content log into the virtual meeting at first, second, or third receiver computers 104a, 104b, and 104c, respectively, the deliverer and the receiver individuals may utilize their network infrastructure to gain appropriate connectivity, e.g., 5G connectivity, into the environment. The present embodiments may take advantage of existing and future 5G infrastructure and its increase of bandwidth, latency, and scaling of applications requiring large amounts of real-time data. The server 112 may trigger data and command flows to be processed by distributed virtual meeting presenter automated selection programs that are available at one or more network edge servers located at a network edge and/or that are available at a respective edge/gateway server located at a network gateway. Broadcast quality data and usage data can also flow from the edge gateway/server through the network edge server for access by the server 112 which helps implement virtual meeting presenter automated selection capability in the virtual meeting tool.

A computer system with the virtual meeting presenter automated selection program 110a1, 110a2, 110a3, 110b, 110c1, 110c2, 110c3 operates as a special purpose computer system which may help perform the virtual meeting presenter automated selection process 200 for the presentation of a virtual meeting. In particular, the virtual meeting presenter automated selection program 110a1, 110a2, 110a3, 110b, 110c1, 110c2, 110c3 transforms a computer system into a special purpose computer system as compared to currently available general computer systems that do not have the virtual meeting presenter automated selection program 110a1, 110a2, 110a3, 110b, 110c1, 110c2, 110c3 installed thereon.

The AI system may help achieve contextual presentation run-time state and relative application package transfer and sharing and may predict a best-situated presenter for a backup in an ongoing web/virtual conference.

The virtual meeting presenter automated selection program 110a1, 110a2, 110a3 may be implemented as a software plugin component on the respective computers for the meeting host team and may continue to monitor the respective client machine/computer of the host team first, second, and third computers 102a, 102b, 102c. This monitoring obtains data which gives the input to the server/AI/machine learning model about the status of each of the client machines for various broadcasting parameters. This data may be used to decide which client machine should have control after weighing the attributes of each of the users on the identified attributes. The attributes will hold information of the possible broadcast, technology, computing, and/or software hindrances of each of the host team members. The attributes may also hold information of the matching system dependencies and pre-requisites for the current presentation in scope.

Instead of being a plugin to virtual meeting software, the virtual meeting presenter automated selection program 110a1, 110a2, 110a3, 110b, 110c1, 110c2, 110c3 may alternatively execute as a dedicated software application which incorporates virtual meeting capabilities between computers. The virtual meeting presenter automated selection program 110a1, 110a2, 110a3, 110b, 110c1, 110c2, 110c3 installed on the respective computers may be referred to as an AI agent to execute some of the functionality.

The AI agent may in some embodiments have the ability to determine the co-presenters in the group in advance, either by machine learning prediction or by data receipt/upload. The AI agent may also be able to perform topic matching and map the meeting agenda/timeline series in any presentation to handover the presentation.

The AI-based contextual presentation run-time state and relative application package transfer and sharing helps the presentation to be carried out without any or with reduced viewing turbulence to remaining participants. The meeting presenter switch may be carried out in a seamless manner. The run-time state may transfer and hold the current state of the current presenter such as the selected/used software being ran, a scroll position, and a zoom level, etc. as a seamless transfer of presentation control is switched to a back-up presenter, if necessary. For example, presentation components such a slide generation program, a web browser with authorized cookies and a particular web page being opened, and a relational database are in some embodiments included as part of the seamless transfer of the presentation control. The scroll position and zoom level in a web page may be included in some embodiments as part of the seamless transfer.

Based on the identified best back-up peer machine, the AI system may in some embodiments send a notification to the computer of the backup presenter. Upon approval granted via actuation at a graphical user interface by one or both of the initial presenter and the selected back-up presenter, the AI system may transfer and inject the presentation run-time state packet from the computer of the initial presenter to the computer of the backup peer. The AI system may synchronize the client machines in terms of presentation. For example, if the lead presenter is showing the fourth slide and has a cursor at the fifth point of the fourth slide, during the transfer to the back-up peer machine, the back-up peer computer will show the presentation materials also at the fourth slide with the cursor being at the fifth point of the fourth slide. Thus, the transfer may achieve presentation handover at the same screen materials and at the same point in the presentation in a seamless manner. This type of handover may be achieved by the AI system for other presentation materials as well such as video clips.

The AI system may also send the necessary content/runtime prerequisites as a volatile container to the identified best backup peer machine to have seamless presentation transfer. If a presentation is intended to switch back and forth between multiple audiovisual files ran on different applications, all of the various files and supporting programs for running these files may be considered as necessary content/runtime prerequisites and may be included in the volatile container. A virtual machine may be an example of the container that is created and loaded. The container may be within the server 112 that is shown in FIG. 1, may be in another server within the cloud and connected to the communication network 116, or may be arranged in a distributed manner amongst multiple servers connected to the communication network 116, e.g. including the server 112.

Figure 2A:
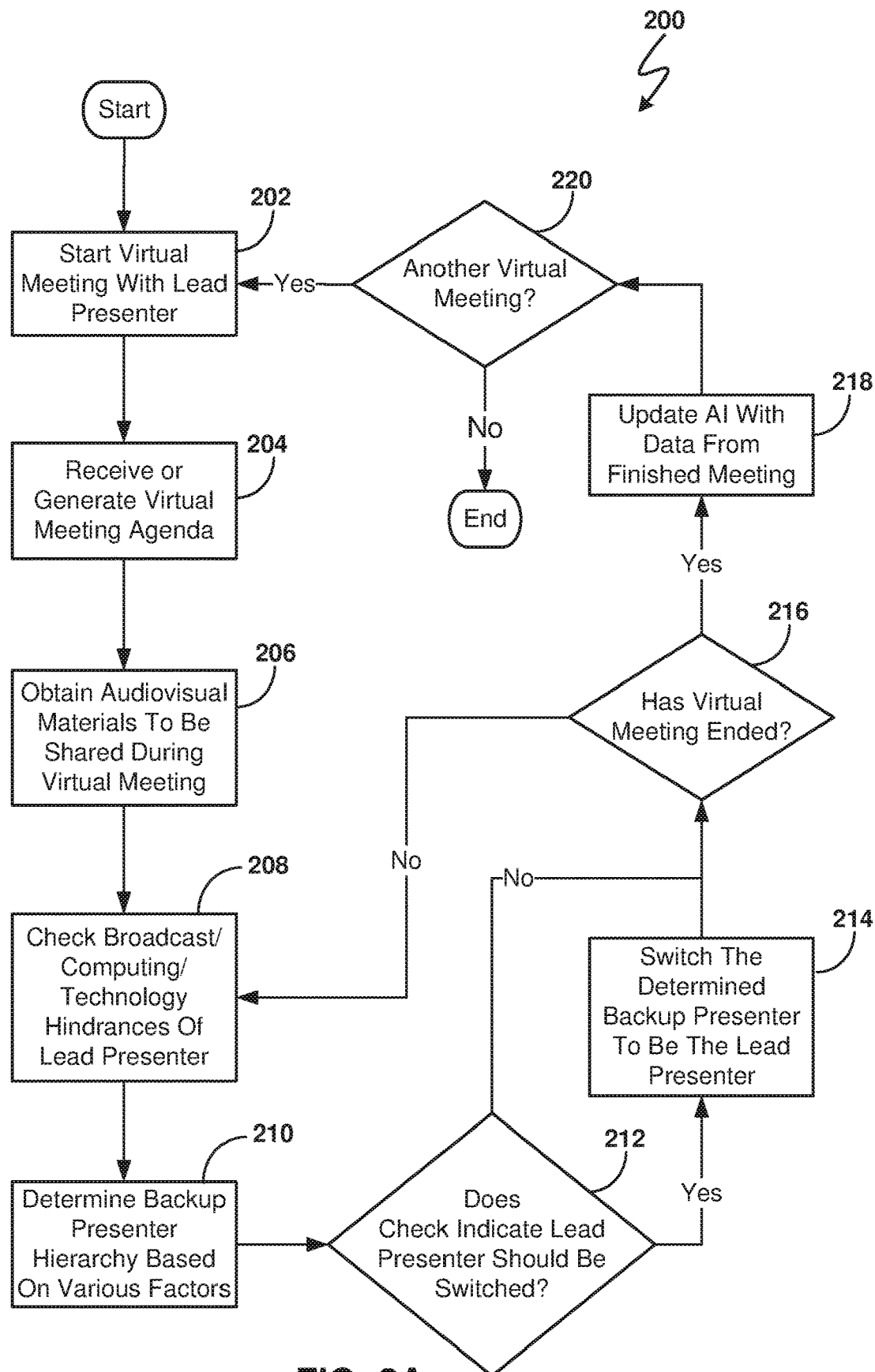
FIG. 2A is an operational flowchart illustrating a virtual meeting presenter automated selection process according to at least one embodiment.

Referring now to FIG. 2A, an operational flowchart depicts a virtual meeting presenter automated selection process 200 that may, according to at least one embodiment, be performed using the virtual meeting presenter automated selection program 110*a*1, 110*a*2, 110*a*3, 110*b*, 110*c*1, 110*c*2, 110*c*3. The virtual meeting presenter automated selection program 110*a*1, 110*a*2, 110*a*3, 110*b*, 110*c*1, 110*c*2, 110*c*3 may include various modules, user interfaces, services, and virtual meeting tools and may use data storage when the virtual meeting presenter automated selection process 200 is performed.

The virtual meeting presenter automated selection program 110*a*1, 110*a*2, 110*a*3, 110*b*, 110*c*1, 110*c*2, 110*c*3 may operate as a plugin which is added to a particular virtual meeting program such as WebEx® (WebEx and all WebEx-based trademarks and logos are trademarks or registered trademarks of Cisco Technology, Inc. and/or its affiliates). The virtual meeting presenter automated selection program 110*b* may be a program instance which is disposed at a server 112 which may be in the cloud.

In a step 202 of the virtual meeting presenter automated selection process 200, a virtual meeting with a lead presenter is started. Although in some instances a team of individuals helped prepare and plan for a virtual presentation or are knowledgeable about the presentation being given, in many instances one person is designated as a presenter for a particular part of a virtual meeting. During this time, other participants from the host team are expected to be quiet and defer to the lead presenter who will be speaking and explaining during a virtual meeting segment. The screen contents on the display screen of the computer of the designated lead presenter will be shared with the other participants of the virtual meeting.

A virtual meeting may be started by virtual meeting software being used on a computer such as one of the first, second, and third host team computers 102*a*, 102*b*, and 102*c*. A stream is created that travels through the communication network 116. With the beginning of the virtual meeting, other participants may join into view and/or listen to the video and/or audio stream of the virtual meeting. For example, users at the first, second, and third receiver computers 104*a*, 104*b*, 104*c* may join in and listen to/view the audio and visual material content that is being generated from one of the host team computers and/or from a server in the cloud. In some instances, users at the first, second, and third receiver computers 104*a*, 104*b*, 104*c* may be clients and/or prospective clients of a group of people which constitute the host team. Each participant in the virtual meeting may have standard virtual meeting software installed on their respective computer. Although the receiver computers are likely not to be selected to be presenters by the virtual meeting presenter automated selection process 200, these receiver computers may nevertheless in some embodiments include some instance of the virtual meeting presenter automated selection program 110*c*1, 110*c*2, 110*c*3 so that users at these receiver computers may give feedback about broadcast aspects of the virtual meeting presentation and any automated switching of the presenter that occurs in the virtual meeting presenter automated selection process 200. For example, the meeting end viewers may at the conclusion of a virtual meeting be asked via a graphical user interface for their feedback about the broadcast quality during the virtual meeting, e.g., for the broadcast quality at the time of a switch of presenters from an initial presenter to a back-up presenter who was selected in an automated manner via the virtual meeting presenter automated selection program 110*a*1, 110*a*2, 110*a*3, 110*b*.

The virtual meeting presenter automated selection program 110*a*1, 110*a*2, 110*a*3 may be added as a plug-in onto digital meeting software program so that the initiation of a virtual meeting within the digital meeting software program notifies the virtual meeting presenter automated selection program 110*a*1, 110*a*2, 110*a*3 of the start of the meeting. The virtual meeting presenter automated selection program 110*a*1, 110*a*2, 110*a*3 may alternatively or additionally to operating as a plugin have an application programming interface connection to the digital meeting software program that is installed on the respective first, second, or third host computer 102a, 102b, 102c. This application programming interface connection may allow the virtual meeting presenter automated selection program 110a1, 110a2, 110a3 to receive, from the digital meeting software program, a notification of initiation of a virtual meeting. A leader or an individual of a host team may register a virtual meeting on the virtual meeting software program and may arrange transmission details for the virtual meeting. As a part of this registration, potential viewers/participants may be notified of a date and time of when the virtual meeting will take place. The virtual meeting presenter automated selection program 110a1, 110a2, 110a3 at the host team first, second, or third computers 102a, 102b, 102c may via the communication network 116 transmit a virtual meeting starting signal to the virtual meeting presenter automated selection program 110b at the server 112.

As part of the virtual meeting that begins in step 202, screen sharing may occur so that contents shown on the screen of a computer of the lead presenter or on the screen of a helper from the host team are transmitted via the virtual meeting software program and the communication network 116 to other computers participating in the virtual meeting such as the receiver computers and others of the host team computers. The virtual meeting software program may transmit one or more digital files with meeting content that may include word processing documents, murals, pictures, videos, audio recordings, spreadsheets, images, project management and team collaboration tool documents/boards, slides, frames, etc. The one or more digital files may include various components of an audio, visual, or audiovisual nature which may be transmitted during a virtual meeting to provide information to virtual meeting attendees. The various components may help provide crisp information that will interest virtual meeting attendees/participants and may be easily viewed and in some embodiments reviewed by the content receivers. In some embodiments, images from these various presentation materials along with accompanying audio may be transmitted to the other participants of the virtual/web conference.

The meeting content that is received may be stored in memory that is part of the virtual meeting presenter automated selection program 110a1, 110a2, 110a3, 110b, 110c1, 110c2, 110c3 or that is accessible to the virtual meeting presenter automated selection program 110a1, 110a2, 110a3, 110b, 110c1, 110c2, 110c3. For example, meeting content may be saved in the database 114 shown in FIG. 1, in the RAM 308 that is shown in FIG. 3, in memory of a server within and connected to the communication network 116, and/or in other memory in one or more remote servers that is accessible to the virtual meeting presenter automated selection program110a1, 110a2, 110a3, 110b via the communication network 116 and/or via a wired connection.

In a step 204 of the virtual meeting presenter automated selection process 200, a virtual meeting agenda is received or generated. This agenda may be for the virtual meeting that was started in step 202 of the virtual meeting presenter automated selection process 200. For example, the virtual meeting presenter automated selection program 110a1, 110a2, 110a3, 110b may receive or generate a virtual meeting agenda. This virtual meeting agenda may be uploaded in advance of the virtual meeting or at a beginning of the virtual meeting. Thus, in some embodiments the step 204 may occur before the step 202 occurs in the virtual meeting presenter automated selection process 200. In other embodiments the step 204 may occur after or simultaneously with the step 202 in the virtual meeting presenter automated selection process 200.

In some embodiments, the artificial intelligence may generate the virtual meeting agenda by analyzing various aspects of the virtual meeting such as content being presented, the identities of the host team, and the identities of meeting participants and comparing this information to previous virtual meeting information. Thus, in some embodiments the virtual meeting presenter automated selection program 110a1, 110a2, 110a3, 110b may include a machine learning model configured to output a virtual meeting agenda based on various inputs received. The virtual meeting presenter automated selection program 110a1, 110a2, 110a3, 110b may include an audio analyzer which records words spoken during the virtual meeting, which performs speech-to-text conversion of the recorded audio, and which inputs the transcribed text into the machine learning model which generates a virtual meeting agenda. Visual text materials displayed during the virtual meeting may also be input into this machine learning model which generates a virtual meeting agenda. Optical character recognition may be performed by the virtual meeting presenter automated selection program 110a1, 110a2, 110a3, 110b for some audiovisual materials to convert text in image form to machine-readable text that may be input into the agenda-outputting machine learning model. Step 218 which will be described subsequently may also be used after the completion of a virtual meeting to allow a user to provide feedback about a machine learning model-generated agenda and the accuracy of same. This feedback may be fed into the machine learning model as a way of supervised learning to further train and refine the machine learning model for improved prediction for future virtual meetings.

In a step 206 of the virtual meeting presenter automated selection process 200, the audiovisual materials to be shared during the virtual meeting are obtained. This step 206 may be performed by the virtual meeting presenter automated selection program 110a1, 110a2, 110a3, 110b obtaining the audiovisual materials. This virtual meeting may refer to the virtual meeting that was started in step 202 and for which an agenda was received or generated in step 204. These audiovisual materials may be uploaded in advance of the virtual meeting or at a beginning of the virtual meeting so that the audiovisual materials may be saved in the cloud, e.g. in a dynamic container, e.g., in a virtual machine. For example, a user from the host team who is using one of the host team first, second, or third computers 102a, 102b, or 102c may upload a file containing audiovisual materials. The virtual meeting presenter automated selection program 110a1, 110a2, or 110a3 at the respective one of the host team first, second, or third computers 102a, 102b, or 102c may then transmit the one or more uploaded files via the communication network 116 to the meeting presenter automated selection program 110b at the server 112.

In some embodiments, at or near the beginning of the meeting the virtual meeting presenter automated selection program 110a1, 110a2, 110a3, 110b may prompt the respective member of the host team to upload some or all of the audiovisual contents that are expected to be used during the meeting. These audiovisual contents may include word processing documents, murals, pictures, videos, audio recordings, spreadsheets, images, project management and team collaboration tool documents/boards, slides, frames, etc.

The virtual meeting presenter automated selection program 110a1, 110a2, 110a3, 110b may also configure the dynamic container in the cloud to receive an upload of the necessary software package to present/display/show any of the audiovisual contents of the presentation deck being used.

Figure 2B:
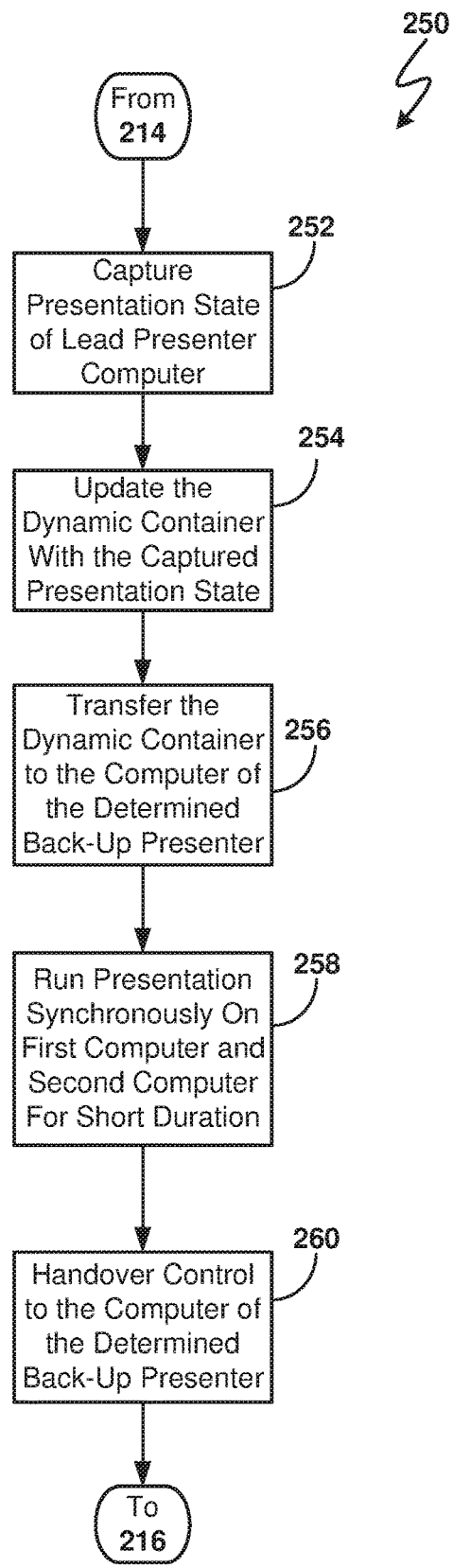
FIG. 2B is an operational flowchart illustrating a presentation material transfer process which according to at least one embodiment is part of or supplemental to the virtual meeting presenter automated selection process of FIG. 2A.

In some embodiments, the generation of the dynamic container may occur as part of presentation control switching of step 214 as will be described subsequently and in more detail in the presentation material transfer process 250 that is depicted in FIG. 2B. Thus, in this described embodiment the step 206 may occur simultaneously with and as part of the step 214.

In a step 208 of the virtual meeting presenter automated selection process 200, broadcasting/computing/technology hindrances of the lead presenter are checked. The check of all of these factors mentioned above and described below may collectively be referred to as a broadcast hindrance update. This check occurs with respect to the computer that the lead presenter is using to present for the virtual meeting that was started in step 202. For example, this check may occur with respect to the first, second, or third host team computer 102a, 102b, 102c which the lead presenter is using to present materials during the virtual meeting. The lead presenter may be speaking into a microphone that is connected to the respective first, second, or third host team computer 102a, 102b, 102c in a manner that causes the recipients/end viewers of the virtual meeting to hear the voice and words spoken by the lead presenter. These recipients/end viewers may be individuals at the first, second, and third receiver computers 104a, 104b, 104c who have joined into the virtual meeting and may include other members of the host team, e.g., individuals at the two of the first, second, and third host team computers 102a, 102b, 102c who are not currently presenting. The respective end viewers may join in the virtual meeting by logging into virtual meeting software and accepting a virtual meeting invitation and/or by entering meeting identification information. This virtual meeting software may be separate from or part of the virtual meeting presenter automated selection program 110a1, 110a2, 110a3, 110b, 110c1, 110c2, 110c3.

If the lead presenter is presenting from the host team first computer 102a as part of the virtual meeting that was begun in step 202, an analysis of the computing/technology/software/broadcast capabilities of the host team first computer 102a will be performed by the client agent/the virtual meeting presenter automated selection program 110al during the virtual meeting.

For the check of step 208, the virtual meeting presenter automated selection program 110al at the respective computer, e.g., at the host team first computer 102a, may analyze a current battery charge, remaining battery time, and/or battery charging status of that computer. The check of these broadcast capability factors may indicate the chances of the lead presenter maintaining power for the computer during the broadcast. If the battery charge and/or the remaining battery time is low and the battery is not currently charging, the virtual meeting presenter automated selection program 110al may recognize that another person of the host team who has enough power to operate their computer may be better suited to be the presenter for the duration or for a part of the duration of the virtual meeting. The charging components of the host team first computer 102a may be damaged and not functioning. The power in a neighborhood, building, or residence may be out due to various reasons, but the power by another member of the host team may who is at a different physical location may be available and steady. If the current battery charge is low but the battery is currently charging, the virtual meeting presenter automated selection program 110al may estimate that this presenter will have enough power for the duration of the meeting.

If the battery has a full charge but is not currently charging, the virtual meeting presenter automated selection program 110al may check the remaining battery time and compare this time with an estimated or pre-determined length of the virtual meeting. If the remaining battery time is shorter than the length of the virtual meeting, the virtual meeting presenter automated selection program 110al may recommend a switch of presenter computers as will be described subsequently for steps 212 and 214.

The virtual meeting presenter automated selection program 110al may perform these checks of the battery and battery-related issues by conducting an application programming interface communication with an operating system of the computer, e.g., of the host team first computer 102a. The operating system may include battery data about the battery of the computer, e.g., of the host team first computer 102a.

For the check of step 208, the virtual meeting presenter automated selection program 110al at the respective computer, e.g., at the host team first computer 102a, may additionally and/or alternatively analyze a level/amount/type of background noise in an immediate environment of the host team first computer 102a. The virtual meeting presenter automated selection program 110al may query an operating system of the respective computer which receives sound from a microphone connected to the computer. If the microphone catches a disruptive level of noise from the background, the virtual meeting presenter automated selection program 110al may determine that a switch for another user at a computer at a different physical location may be better for the presentation that is part of the virtual meeting. For example, if construction that generates loud noises is occurring in a building and/or neighborhood of the respective computer of the initial or current presenter, the end viewers may have a difficult time hearing the spoken words of the lead presenter. If associates, e.g., small children, and/or animals at a location of the first presenter are generating significant noise, the end viewers may have a difficult time hearing the spoken words of the lead presenter. Under such circumstances, the virtual meeting presenter automated selection program 110al may carry out a switch of presentation control to a backup presenter computer in a step 214 that will be described subsequently and/or the virtual meeting presenter automated selection program 110al may recommend that a switch of presentation control to a backup presenter computer be carried out.

In at least some embodiments, the virtual meeting presenter automated selection program 110al may have a threshold of 35 dBa for background noise in that background noises of greater or equal to 35 dBa at the host team first computer 102a may trigger a switching of presentation controls to the computer of the backup presenter.

In at least some embodiments, the virtual meeting presenter automated selection program 110a1, 110a2, 110a3, 110b may include an ambient noise determination module which measures the intensity of ambient noise using a microphone of or connected to the respective host team computer. The ambient noise determination module may measure maximum and average sound levels in decibels based on the sound measured by the computer microphone. In some embodiments, the ambient noise determination module may compare the audio files recorded during the presentation at the presenter host team computer to calibrated audio files which have sounds at pre-determined levels.

For the check of step 208, the virtual meeting presenter automated selection program 110al at the respective computer, e.g., at the host team first computer 102a, may additionally and/or alternatively analyze a current speed and/or bandwidth of the internet to which the computer of the current lead host is connected. The virtual meeting presenter automated selection program 110al at the respective computer, e.g., at the host team first computer 102a, may analyze an upload speed for the computer to upload files to the internet as part of the presentation of the virtual meeting. The virtual meeting presenter automated selection program 110al at the respective computer may analyze whether the internet connection of the computer is a consumer-grade internet broadband connection and/or an enterprise-grade internet broadband connection. The virtual meeting presenter automated selection program 110al at the host team first computer 102a may perform a speed and/or bandwidth test in conjunction with the virtual meeting presenter automated selection program 110b at the server 112 or in conjunction with another server in the cloud. This speed and/or bandwidth test may include repeatedly measuring the time required for a specific file to leave the host team first computer 102a and then be downloaded at the other server, e.g., at the server 112. If the bandwidth and/or speed of the lead presenter computer is measured as being low, the virtual meeting presenter automated selection program 110al may determine that the presentation would be better suited to be led by another member of the host team. For example, the internet download speed of the lead presenter computer may be deemed acceptable if it has an internet download speed of at least ten megabits (10 Mbps) per second or at least twenty megabits per second (20 Mbps). The download speed of the lead presenter computer may be deemed acceptable if it has an internet upload speed of at least three megabits per second (3 Mbps) or at least five megabits per second (5 Mbps). A ping/latency of 40 milliseconds (40 ms) or 100 milliseconds (100 ms) or less may be deemed as acceptable. The virtual meeting presenter automated selection program 110al may weigh the speed and bandwidth against audiovisual material needs for the broadcast. If audiovisual needs are high for the broadcast, then a smaller internet bandwidth/speed problem may trigger a presentation control switch recommendation. If audiovisual needs are low for the broadcast, then a larger problem with internet bandwidth/speed may be required to trigger a presentation control switch recommendation.

As a part of or related to these checks of the internet capabilities, the virtual meeting presenter automated selection program 110al may analyze a strength of a Wi-Fi connection which the computer of the lead presenter may be using to connect to a local Wi-Fi system which connects to the larger system of the communication network 116. A stronger Wi-Fi connection will relate to improved internet speed and/or bandwidth. The virtual meeting presenter automated selection program 110al may inquire from the operating system of the computer of the lead presenter to determine the strength of an internet connection. This strength of the Wi-Fi internet connection may be skipped or rated as a favorable point for the analysis of the lead host computer if the lead host computer has a wired connection to the internet instead of a Wi-Fi connection.

For the check of step 208, the virtual meeting presenter automated selection program 110al at the respective computer, e.g., at the host team first computer 102a, may additionally and/or alternatively analyze a microphone quality of the microphone connected to the computer and into which the lead presenter is speaking. The virtual meeting presenter automated selection program 110al may query an operating system of the respective computer which receives sound from a microphone connected to the computer. The virtual meeting presenter automated selection program 110al may also perform speech-to-text transcription of the audio being provided by the lead presenter as the lead presenter speaks into the microphone. The virtual meeting presenter automated selection program 110al may correlate a low rate of word transcription with poor word capture of the microphone, as the speech transcription module struggles to decipher the verbal words that are being spoken. The virtual meeting presenter automated selection program 110al may correlate a high rate of word transcription with good word capture of the microphone, as the speech transcription module succeeds in understanding the verbal words that are being spoken. The virtual meeting presenter automated selection program 110al may compare a rate of word transcription with overall sound levels coming from the microphone, as a low rate of word transcription would necessarily occur if the lead presenter stops speaking for some time segments.

The virtual meeting presenter automated selection program 110al may also include an audio file analysis module and use this module to check a quality of sound coming from the microphone connected to the computer of the lead host. The audio file analysis module may produce a spectrogram of the recorded audio and analyze the spectrogram. The audio file analysis module may determine a frequency measurement such as a kHz of the audio file to measure the audio quality.

The virtual meeting presenter automated selection program 110al may also include a volume/decibel level of the recorded audio and use this determination to check a quality of sound coming from the microphone connected to the computer of the lead host. If the virtual meeting presenter automated selection program 110al measures a decibel level/volume that is lower than a pre-determined threshold associated with a quality sound, the virtual meeting presenter automated selection program 110al may recommend for the presenting role of this virtual meeting to be switched to a different computer from the host team.

For the check of step 208, the virtual meeting presenter automated selection program 110al at the respective computer, e.g., at the host team first computer 102a, may additionally and/or alternatively analyze a camera quality of the camera connected to the computer and which is filming the lead presenter. The virtual meeting presenter automated selection program 110al may include a machine learning model into which camera/video images are input and a quality determination is output. For the check of step 202, the video stream or images of same recorded by a camera of the computer of the lead presenter may be fed into this image quality machine learning model and as output an image quality rating and/or recommendation may be given. Also as output the image quality machine learning model may provide image quality improvement tips on the screen of the computer of the lead presenter. These tips may include recommendations such as add background lighting.

For the check of step 208, the virtual meeting presenter automated selection program 110al at the respective computer, e.g., at the host team first computer 102a, may additionally and/or alternatively analyze a processing speed of the computer of the lead presenter. The virtual meeting presenter automated selection program 110al may perform this check of the processing speed by conducting an application programming interface communication with an operating system of the computer, e.g., of the host team first computer 102*a*. The operating system may have stored the information of the processing speed of the processor(s) of the computer. The virtual meeting presenter automated selection program 110*al* may also compare processing speed with audiovisual materials planned for the virtual meeting to determine whether processing speed is sufficient or may be problematic (e.g., possibly or likely insufficient) for the lead presenter.

For the check of step 208, the virtual meeting presenter automated selection program 110*al* at the respective computer, e.g., at the host team first computer 102*a*, may additionally and/or alternatively analyze a likelihood that the computer of the lead presenter will crash, freeze, overheat, and/or unexpectedly restart. This checking may be performed by the virtual meeting presenter automated selection program 110*al* checking performance of the computer throughout a time period which occurred before the virtual meeting started. The virtual meeting presenter automated selection program 110*al* may perform these checks by conducting an application programming interface communication with an operating system of the computer, e.g., of the host team first computer 102*a*. Tallies and frequency of these events may be counted and/or determined and may be the basis or a partial basis for a switching decision. These scenarios regarding freezing, crashing, etc. may collectively be referred to as hardware capabilities.

For the check of step 208, the virtual meeting presenter automated selection program 110*al* at the respective computer, e.g., at the host team first computer 102*a*, may additionally and/or alternatively analyze whether the computer of the lead presenter has the requisite software installed thereon to actuate and use all of the files containing the audiovisual materials for the virtual meeting.

In a step 210 of the virtual meeting presenter automated selection process 200, a backup presenter hierarchy is determined based on various factors. The virtual meeting presenter automated selection program at the other host computers may be analyzing the respective computer and its connections for all/most/some of those factors that are being checked in step 208. For example, if the host team included three people stationed at the host team first, second, and third computers 102*a*, 102*b*, 102*c* and the host team member at the host team first computer 102*a* starts the virtual meeting as the lead presenter, then the virtual meeting presenter automated selection program 110*a*1, 110*a*2 at the host team second and third computers 102*b*, 102*c*, respectively, may analyze these host team second and third computers 102*b*, 102*c* and the connections of these computers to determine which of those computers is well suited for presenting if trouble occurs with the computer/connections of the host team first computer 102*a*. FIG. 1 shows as an example three computers for the host team. In other embodiments, the host team with their own respective computer may include more than three total host team members and host team computers. Any member of a larger group of a host team and their computers could be potential backup presenters for part or the rest of the virtual meeting. These host team members may all be working from a home, personal office, or some other office and so may each have different broadcasting/computing capabilities from their respective location.

For example, the virtual meeting presenter automated selection program 110*a*2, 110*a*3, i.e., client agent, at the computers of the other host team members besides the lead presenter may, like the client agent at the computer of the lead presenter, analyze these computers for one or more of battery health/current computer power charge, background noise levels, internet speed/bandwidth/Wi-Fi connection strengths, microphone quality, camera quality, computer processing speed, computer crash/freeze/overheat/unexpected restart likelihood, available software, etc. Because other host team members are often on mute and not speaking during the presentation by another host team member, the client agent on their respective computer/device may have limited ability to take a live measurement of a microphone quality because the viewer at this computer is not speaking. In such cases, a stored quality analysis for the sound quality at that computer device may be analyzed by the client agent. The stored quality analysis may be generated earlier at a different time before the start of the current virtual meeting. The stored quality analysis may be saved in the database 114 that is accessible by the virtual meeting presenter automated selection program 110*a*2, 110*a*3. Information gathered from the various host team computers from the client agents installed thereon during the virtual meeting may be referred to as first information for this determination of the hierarchy.

In addition to a live analysis of broadcast/computing abilities of the computers of the other host team members, the virtual meeting presenter automated selection program 110*a*2, 110*a*3, 110*b* may also tap into user profiles of the other host team members to better determine who would be a best backup presenter for a particular topic. A bank of profiles of host team members may be stored in a database 114 accessible to the meeting presenter automated selection program 110*b* in the server 112. These profiles may be generated and stored after receiving express consent from the members and subject to applicable privacy laws. The information used to generate these profiles may be obtained during the user registration with the virtual meeting presenter automated selection program. 110*a*1, 110*a*2, 110*a*3. These profiles may be kept and updated, for example, as may occur in step 218 that will be described subsequently. All members of the host team, and thus the possible back-up presenters, may have profiles stored for them in the profile bank. Identities of the individuals may be stored in the profile bank with the associated technical background/experience information about these people. Information from these profiles may be referred to as second information for this determination of the hierarchy.

The profiles may include technical areas of expertise for each host team member. The virtual meeting presenter automated selection program 110*a*2, 110*a*3 may compare the technical areas of expertise indicated in the respective stored host team member profile with a subject of the current virtual meeting, e.g., as captured in the virtual meeting agenda that was made or received in step 204 and/or as captured from natural language processing techniques applied to visual materials received as part of the presentation deck and/or as captured from materials spoken by a person or on an audio recording and on which speech-to-text transcription was performed. For audio words spoken, the speech-to-text transcription may be followed by natural language processing techniques on the transcribed text. This comparison may generate a technical familiarity score for the host team member with respect to the current content of the virtual meeting.

The profiles may additionally and/or alternatively include a tally and analysis of the past experience the respective host team member has in being a lead presenter for this type of meeting, e.g., for this same exact presentation given to another audience and/or on another occasion.

The virtual meeting presenter automated selection program 110*a*2, 110*a*3 at the respective host team computer may generate a backup presenter score from the various factors. Each of these scores may be transmitted to the virtual meeting presenter automated selection program 110*b* at the server 112 and/or to the computers of the other host team members for comparison of the scores from each host team member. The virtual meeting presenter automated selection program, e.g., the virtual meeting presenter automated selection program 110*b* may compare all of the scores and rank the various host team members in an order based on their analyzed suitability to be the backup presenter. The hierarchy may include a descending rank of the various host team members from first backup (highest recommended) to last backup (lowest recommended). The hierarchy may include a score and class ranking for each of the various host team members. For example, if three other host team members are classified as excellent backups, this classification of "excellent" may be presented along with all three of their entries in the hierarchy along with their ranking of first, second, and third.

In a step 212 of the virtual meeting presenter automated selection process 200, a determination is made as to whether the check indicates that the lead presenter should be switched. This check refers to the checking of step 208 that was described earlier and that is part of the virtual meeting presenter automated selection process 200. If an affirmative determination is made in step 212 that the check indicates that the lead presenter should be switched, the virtual meeting presenter automated selection process 200 may proceed to step 214. If a negative determination is made in step 212 and the check does not indicate that the lead presenter should be switched, the virtual meeting presenter automated selection process 200 may skip step 214 and may proceed directly to step 216.

The determination of step 212 may include the calculation of a switch recommendation score by the virtual meeting presenter automated selection program 110*a*1 based on the factors that were analyzed in the checking of step 208 regarding the computer and connections of the lead presenter. Each factor may be weighted and scored. The switch recommendation score may be based on summing each of the factor scores, e.g., weighted factor scores. The virtual meeting presenter automated selection program 110*al* may recommend a switch if the switch recommendation score falls below a pre-determined threshold. The virtual meeting presenter automated selection program 110*al* may recommend a switch if the switch recommendation score is less than a backup presenter score that was determined as part of step 210, e.g., is less than a backup presenter score by a pre-determined threshold. For example, if a backup presenter computer is analyzed as having slightly better broadcast capabilities than the initial presenter no switching recommend may be made according to some embodiments. However, if a backup presenter computer is analyzed as having substantially better broadcast capabilities than the initial presenter, e.g., with a score difference larger than a pre-determined threshold, a switching recommendation may be made according to some embodiments.

The virtual meeting presenter automated selection program 110*al* may also recommend a switch if a rating score for one factor is lower or higher than a pre-determined threshold. For example, if the computer of the lead presenter is not able to charge and will be at zero battery power soon the virtual meeting presenter automated selection program 110*al* may recommend an urgent switch regardless of the rating scores for the other factors. Similar expedited recommendations may be made when individual factor scores for background noise, internet speed/bandwidth/Wi-Fi connection, microphone quality, camera quality, computer crashing/freezing/overheating/unexpected restarting are larger or smaller than a pre-determined threshold. In other words, if a small score indicates acceptable good/sufficient broadcasting ability than the factor being larger than the pre-determined threshold would be grounds for an expedited recommendation to be given. Oppositely, if a large score indicates acceptable good/sufficient broadcasting ability than the factor being smaller than the pre-determined threshold would be grounds for an expedited recommendation to be given.

In a step 214 of the virtual meeting presenter automated selection process 200, the determined backup presenter is switched to be the lead presenter. This transfer may occur with consent being given by the initial lead presenter and/or the determined backup presenter and/or by some other manager of the presentation. The AI system may generate a graphical user interface prompt for presentation (e.g., for display or via an audio presentation) at the respective computer to notify of a suggested presenter switch and to obtain consent for same.

The switch may then occur with a first presentation state transfer with a runtime container wherein the necessary audiovisual materials are transferred to a container in the cloud, e.g., via the communication network 116 from the host team first computer 102*a* to the server 112. The virtual meeting presenter automated selection program 110*b* at the server 112 may be considered a central agent for performing the presenter automated selection. Then a second presentation state transfer with the runtime container may occur via the communication network 116 from the server 112 to the other host team computer which is selected as the best backup in the backup presenter hierarchy generated in step 210, e.g. to the host team third computer 102*c*, and specifically to the virtual meeting presenter automated selection program at that computer, e.g., to the virtual meeting presenter automated selection program 110*a*3 at the host team third computer 102*c*. The backup presenter at the backup presenter computer, e.g., at the host team third computer 102*c*, then may proceed to continue with the presentation for the virtual meeting using the audiovisual materials that the initial lead presenter was using and/or according to the virtual meeting agenda. This switch to the backup presenter computer may include sending a control switching signal from the virtual meeting presenter automated selection program 110*b* at the server 112 to the backup presenter computer. If the stream runs through the virtual meeting presenter automated selection program 110*b* at the server 112 before being transmitted to the receiver computers, the virtual meeting presenter automated selection program 110*b* at the server 112, may as part of the seamless presentation control switching, control which computer is currently having its contents shared via screen sharing to the computers of the other meeting participants for the streamed virtual meeting.

In some embodiments, the first runtime state transfer may have already occurred before step 214 occurs so that the transfer may occur more quickly. The presentation state transfer of runtime materials may in that circumstance go from the central agent at the server 112 or somewhere else in the cloud to the backup presenter computer. This embodiment may occur when a user pre-uploads all audiovisual presentation materials through the virtual meeting presenter automated selection program 110*al* into the cloud, e.g., to be stored at the virtual meeting presenter automated selection program 110*b* at the server 112. This embodiment may alternatively occur when the virtual meeting starts and the virtual meeting presenter automated selection program 110*al* uploads the current audiovisual materials into the cloud, e.g., to be stored at the virtual meeting presenter automated selection program 110b at the server 112, and also prompts the host team members to upload any remaining audiovisual materials that will be used for this virtual meeting.

A virtual machine may be an example of the container that is created and loaded. The container may be within the server 112 that is shown in FIG. 1, may be in another server within the cloud and connected to the communication network 116, or may be distributed amongst multiple servers, including the server 112, that are in the and connected to the communication network 116.

In embodiments where the runtime state transfer transfers all necessary software to actuate the files for the audiovisual materials, the available software already stored at the computers of the other host team members will decrease in importance for determining a suitable back-up presenter.

FIG. 2B depicts a presentation material transfer process 250 which provides details about the switching of step 214. FIG. 2B depicts that the presentation material transfer process 250 starts from step 214 of the virtual meeting presenter automated selection process 200 shown in FIG. 2A. FIG. 2B also depicts that the presentation material transfer process 250 ends by returning to step 216 of the virtual meeting presenter automated selection process 200 shown in FIG. 2A.

In step 252 of the presentation material transfer process 250, a presentation state of the lead presenter computer is captured. In the example described above where the initial lead presenter is presenting from the host team first computer 102a, the virtual meeting presenter automated selection program 110a installed at the host team first computer 102a may perform the step 252 of capturing the presentation state. The capturing may include capturing the current state exhibited on the display screen from the host team first computer 102a. This capturing may occur at the time of switching of step 214 as part of seamless switching. The captured state may include details such as the selected/used software being used to generate the current screen display, a scroll position, and a zoom level, etc. For example, presentation components such as a slide generation program, a web browser with authorized cookies and a particular web page being opened, and a relational database are in some embodiments captured as a part of step 252 and then included as part of the seamless transfer of the presentation control. The scroll position and zoom level in a web page may be included in some embodiments as part of the seamless transfer. For example, if the lead presenter is showing the fourth slide and has a cursor at the fifth point of the fourth slide, the client agent/virtual meeting presenter automated selection program 110a installed at the host team first computer 102a may capture these details so that the audiovisual materials may be handed over to the back-up presenter with the materials being at the fourth slide with the cursor being at the fifth point of the fourth slide. The client agent at the lead computer may achieve this capture of step 252 for other presentation materials as well such as video clips.

In step 254 of the presentation material transfer process 250, the dynamic container is updated with the captured presentation state. This captured presentation state may be that presentation state that was captured from the computer of the lead presenter in step 252. The generation of this dynamic container was discussed above in step 206 of the virtual meeting presenter automated selection process 200 shown in FIG. 2A in relation to the obtaining of the presentation deck, e.g., the audiovisual materials and software, for the presentation. A presentation state transmission may be sent from the host team first computer 102a, and particularly from the virtual meeting presenter automated selection program 110a 1 at the host team first computer 102a, to the dynamic container in the cloud, e.g., to the virtual meeting presenter automated selection program 110b in the server 112 and to the database 114 in the server 112. This presentation state transmission may be part of the virtual meeting broadcast that is being distributed to the various computers joined into the virtual meeting and which may be streamed through a central client agent such as the virtual meeting presenter automated selection program 110b in the server 112.

In an alternative embodiment, the dynamic container may first be created in step 254 as opposed to being updated. The creation of the dynamic container is described above with respect to step 206 of the virtual meeting presenter automated selection process 200 depicted in FIG. 2A.

In step 256 of the presentation material transfer process 250, the dynamic container is transferred to the computer of the determined back-up presenter. This dynamic container may be the container that was updated in step 254 with the current presentation state. The determined back-up presenter may be chosen in step 210 in which the hierarchy for backup presenters amongst the host team members is determined. Continuing an above example in which the host team member using the host team third computer 102c is selected by the virtual meeting presenter automated selection program 110a1, 110a2, 110a3, 110b as the first backup presenter, the step 256 may include transferring the dynamic container to the host team third computer 102c. In some embodiments, this step of 256 may include generating a connection between the dynamic container, e.g., a virtual machine in the cloud, and the computer of the determined back-up presenter.

In step 258 of the presentation material transfer process 250, the presentation runs synchronously on the first computer and on the second computer for a short duration. This first computer may refer to the computer of the initial lead presenter whose broadcast health was being checked in step 208. This second computer may refer to the computer of the determined back-up presenter to which the dynamic container was transferred in step 256. This short duration may be for a number of seconds such as five seconds or three seconds. The synchronous presentation may help achieve a seamless transfer so that downstream participants in the virtual meeting do not experience an interruption in the showing of the audiovisual materials. In some embodiments, during the synchronous broadcast short duration an audio capture at the first computer and an audio capture at the second computer may both be distributed and transmitted as part of the virtual meeting stream. In some embodiments, during the synchronous broadcast short duration an audio capture occurs at the first computer but not at the second computer to allow the backup presenter a short introductory period so that the backup presenter can timely begin to speak for the presentation. A signal, e.g., with an icon display or audio signal, may be presented at the second computer when audio capture and total control is transferred as will be discussed below with respect to step 260. In some embodiments, during the synchronous broadcast short duration an audio capture occurs at the second computer but not at the first computer.

In step 260 of the presentation material transfer process 250, control of the presentation is handed over to the computer of the determined back-up presenter. This control may occur with the second computer, e.g., the host team third computer 102c, having its input signals change screen and cursor navigation that will be displayed for the presentation transmitted for the virtual meeting. This computer may refer to the second computer of step 258. As part of this control switch, audio may be captured at the second computer so that the determined backup presenter may provide commentary and explanation that will be transmitted in communication network 116 along with visual materials for the virtual meeting. The determined backup presenter has now become the lead presenter for the virtual meeting.

Following step 260 of the presentation material transfer process 250, the presentation material transfer process 250 may end and return to step 216 in the virtual meeting presenter automated selection process 200 shown in FIG. 2A.

In a step 216 of the virtual meeting presenter automated selection process 200, a determination is made as to whether the virtual meeting has ended. This virtual meeting may be that meeting that was started in step 202. If the determination of step 216 is affirmative and the virtual meeting has ended, the virtual meeting presenter automated selection process 200 proceeds to step 218. If the determination of step 216 is negative and the virtual meeting has not ended, the virtual meeting presenter automated selection process 200 returns back to step 208 for a repeat of at least steps 208, 210, and 212.

Thus, the virtual meeting oversight that initially occurred for the broadcast/computing/technology/software capabilities for the computer/location of the initial lead presenter may continue in an ongoing basis as long as this presenter is still presenting according to expected broadcast plans. The virtual meeting oversight that initially occurred for the broadcast/computing/technology/software capabilities for the computer/location of the initial lead presenter may also be repeated for the current lead presenter, i.e., the determined backup presenter, in a repeat of step 208 after a switch of presentation control occurred. For example, if the meeting presentation control/presenting switched to the other host team member stationed at the host team third computer 102*c* then the client agent at this computer may continue to check if this other host team member has connection/broadcast/computer capabilities that are providing and are expected to continue to provide a good virtual meeting broadcast quality. In case this backup presenter experiences broadcast or other hindrances, a further backup presenter may be selected from the group of the host team in a repeat of step 210. If necessary or helpful, a further switch may be carried out in a repeat of steps 212 and 214. The backup presenter hierarchy established in step 210 may change as the meeting progresses through different technical content and/or as broadcasting/computing/power changes occur to the computers of the various host team members.

The repeating of these steps may continue until the virtual meeting ends and until an affirmative determination for a repeat of step 216 leads to step 218.

In a step 218 of the virtual meeting presenter automated selection process 200, the artificial intelligence is updated with data from the finished virtual meeting. This virtual meeting may be that virtual meeting that was started in step 202 and which was being analyzed in other steps of the virtual meeting presenter automated selection process 200. The data may include those hindrance-related data that were gathered in the step 208 regarding the lead computer and the data that were gathered in step 210 for determining the backup presenter. The data may also include virtual meeting agenda data that was received or generated in step 204. The data may include feedback from meeting participants that was received at the virtual meeting presenter automated selection program 110*c*1, 110*c*2, 110*c*3 at the first, second, and third receiver computers 104*a*, 104*b*, 104*c*, respectively. This virtual meeting data may be stored in memory that is part of the virtual meeting presenter automated selection program 110*a*1, 110*a*2, 110*a*3, 110*b*, 110*c*1, 110*c*2, 110*c*3 or in memory that is accessible to the virtual meeting presenter automated selection program 110*a*1, 110*a*2, 110*a*3, 110*b*, 110*c*1, 110*c*2, 110*c*3. For example, the virtual meeting data may be saved in the database 114 shown in FIG. 1, in the RAM 308 that is shown in FIG. 3, in memory of an edge/gateway server or of a network edge server, and/or in other memory in one or more remote servers that are accessible to the virtual meeting presenter automated selection program 110*a*1, 110*a*2, 110*a*3, 110*b*, 110*c*1, 110*c*2, 110*c*3 via the communication network 116. The data may be added to the artificial intelligence including machine learning models that are invoked but also to the presenter profiles.

The end viewers of the meeting may be prompted via the virtual meeting presenter automated selection program 110*c*1, 110*c*2, 110*c*3 at their respective first, second, or third receiver computer 104*a*, 104*b*, 104*c* to provide feedback about the broadcast/sound/video quality of the virtual meeting that just finished and of the presenting skills of the host team members that presented during the virtual meeting. At or after the end of the virtual meeting, the virtual meeting presenter automated selection program 110*c*1, 110*c*2, 110*c*3 at the various first, second, or third receiver computer 104*a*. 104*b*, 104*c*, respectively, may generate and present a user interface for requesting feedback about the broadcast quality of the virtual meeting. Feedback given here may also be stored and added to user profiles, machine learning models, and the system artificial intelligence in step 218 as part of the virtual meeting data.

After the updates of step 218, the virtual meeting presenter automated selection process 200 proceeds to step 220 to determine if another virtual meeting is started. The virtual meeting data that were saved in step 218 may be used during subsequent iterations of the virtual meeting presenter automated selection process 200. For example, in these subsequent performances of the virtual meeting presenter automated selection process 200, steps 204, 208, and/or 210 may be performed using the previous meeting data. The virtual meeting presenter automated selection program may check for a new meeting from the same host team, partially the same host team, and/or from a completely different host team each with a client agent installed thereon for performing the virtual meeting presenter automated selection process 200.

This data may also be used to further train the AI/machine learning models in a supervised manner. Data that is captured may be input along with outcomes experienced to help the machine learning model better learn to recognize when a virtual meeting presenter should be switched based on broadcast/computing/technology factors.

If another virtual meeting is not started, then the virtual meeting presenter automated selection process 200 may end.

It may be appreciated that FIGS. 2A and 2B provide illustrations of some embodiments and do not imply any limitations with regard to how different embodiments may be implemented. Many modifications to the depicted embodiment(s), e.g., to a depicted sequence of steps, may be made based on design and implementation requirements.

FIG. 3 is a block diagram 300 of internal and external components of computers depicted in FIG. 1 in accordance with an illustrative embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

Data processing system 302a, 302b, 304a, 304b is representative of any electronic device capable of executing machine-readable program instructions. Data processing system 302a, 302b, 304a, 304b may be representative of a smart phone, a computer system, PDA, or other electronic devices. Examples of computing systems, environments, and/or configurations that may represented by data processing system 302a, 302b, 304a, 304b include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

First, second, and third host team computers 102a, 102b, and 102c, first, second, and third receiver computers 104a, 104b, and 104c, and server 112 may include respective sets of internal components 302a, 302b and external components 304a, 304b illustrated in FIG. 3. Each of the sets of internal components 302a, 302b includes one or more processors 306, one or more computer-readable RAMs 308 and one or more computer-readable ROMs 310 on one or more buses 312, and one or more operating systems 314 and one or more computer-readable tangible storage devices 316. The one or more operating systems 314 and the virtual meeting presenter automated selection program 110a1, 110a2, 110a3, 110c1, 110c2, 110c3 in the first, second, and third host team computers 102a, 102b, 102c, in the first, second, and third receiver computers 104a, 104b, and 104c, respectively, and the virtual meeting presenter automated selection program 110b in server 112 may be stored on one or more computer-readable tangible storage devices 316 for execution by one or more processors 306 via one or more RAMs 308 (which typically include cache memory). In the embodiment illustrated in FIG. 3, each of the computer-readable tangible storage devices 316 is a magnetic disk storage device of an internal hard drive. Alternatively, each of the computer-readable tangible storage devices 316 is a semiconductor storage device such as ROM 310, EPROM, flash memory, or any other computer-readable tangible storage device that can store a computer program and digital information.

Each set of internal components 302a, 302b also includes a R/W drive or interface 318 to read from and write to one or more portable computer-readable tangible storage devices 320 such as a CD-ROM, DVD, memory stick, magnetic tape, magnetic disk, optical disk or semiconductor storage device. A software program, such as the virtual meeting presenter automated selection program 110a1, 110a2, 110a3, 110b, 110c1, 110c2, 110c3 can be stored on one or more of the respective portable computer-readable tangible storage devices 320, read via the respective R/W drive or interface 318 and loaded into the respective hard drive, e.g., the tangible storage device 316.

Each set of internal components 302a, 302b may also include network adapters (or switch port cards) or interfaces 322 such as a TCP/IP adapter cards, wireless wi-fi interface cards, or 3G, 4G, or 5G wireless interface cards or other wired or wireless communication links. The virtual meeting presenter automated selection program 110a1, 110a2, 110a3, 110c1, 110c2, 110c3 in first, second, and third host team computers 102a, 102b, and 102c and in the first, second, and third receiver computers 104a, 104b, and 104c, respectively, and the virtual meeting presenter automated selection program 110b in the server 112 can be downloaded from an external computer (e.g., server) via a network (for example, the Internet, a local area network or other, wide area network) and respective network adapters or interfaces 322. From the network adapters (or switch port adaptors) or interfaces 322, the meeting content presentation adjustment 110a1, 110a2, 110a3, 110c1, 110c2, 110c3 in host team first, second, and third computers 102a, 102b, and 102c and in first, second, and third receiver computers 104a, 104b, 104c, respectively, and the virtual meeting presenter automated selection program 110b in server 112 are loaded into the respective hard drive, e.g., the tangible storage device 316. The network may include copper wires, optical fibers, wireless transmission, routers, firewalls, switches, gateway computers and/or edge servers.

Each of the sets of external components 304a, 304b can include a computer display monitor 324, a keyboard 326, and a computer mouse 328. External components 304a, 304b can also include touch screens, virtual keyboards, touch pads, pointing devices, and other human interface devices. Each of the sets of internal components 302a, 302b also includes device drivers 330 to interface to computer display monitor 324, keyboard 326 and computer mouse 328. The device drivers 330, R/W drive or interface 318 and network adapter or interface 322 include hardware and software (stored in storage device 316 and/or ROM 310).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
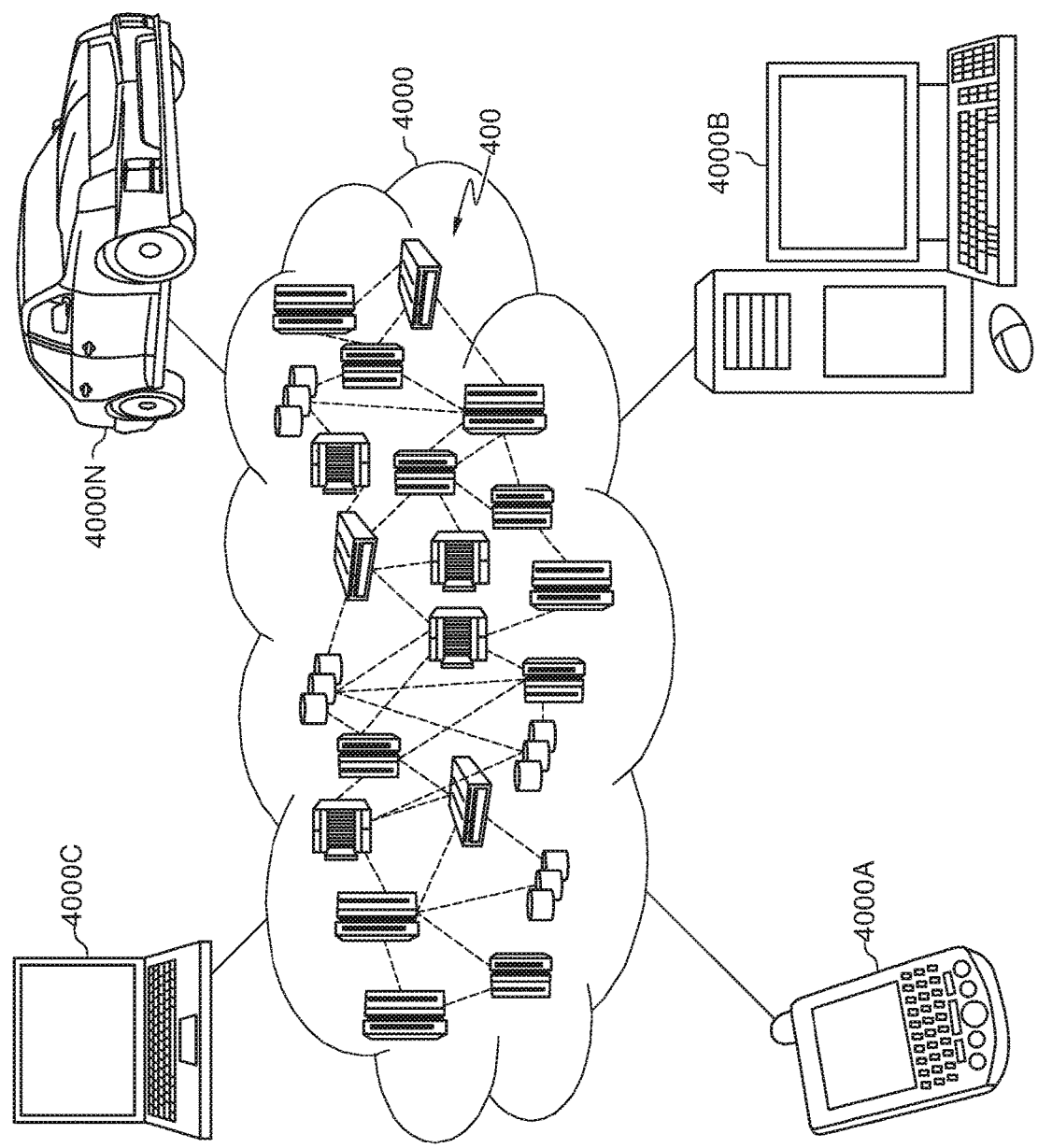
FIG. 4 is a block diagram of an illustrative cloud computing environment including the networked computer environment depicted in FIG. 1, in accordance with an embodiment of the present disclosure.

Referring now to FIG. 4, illustrative cloud computing environment 4000 is depicted. As shown, cloud computing environment 4000 comprises one or more cloud computing nodes 400 with which local computing devices used by cloud consumers, such as, for example, personal digital assistant (PDA) or cellular telephone 4000A, desktop computer 4000B, laptop computer 4000C, and/or automobile computer system 4000N may communicate. Nodes 400 may communicate with one another. They may be grouped (not shown) physically or virtually, in one or more networks, such as Private, Community, Public, or Hybrid clouds as described hereinabove, or a combination thereof. This allows cloud computing environment 4000 to offer infrastructure, platforms and/or software as services for which a cloud consumer does not need to maintain resources on a local computing device. It is understood that the types of computing devices 4000A-N shown in FIG. 4 are intended to be illustrative only and that computing nodes 400 and cloud computing environment 4000 can communicate with any type of computerized device over any type of network and/or network addressable connection (e.g., using a web browser).

Figure 5:
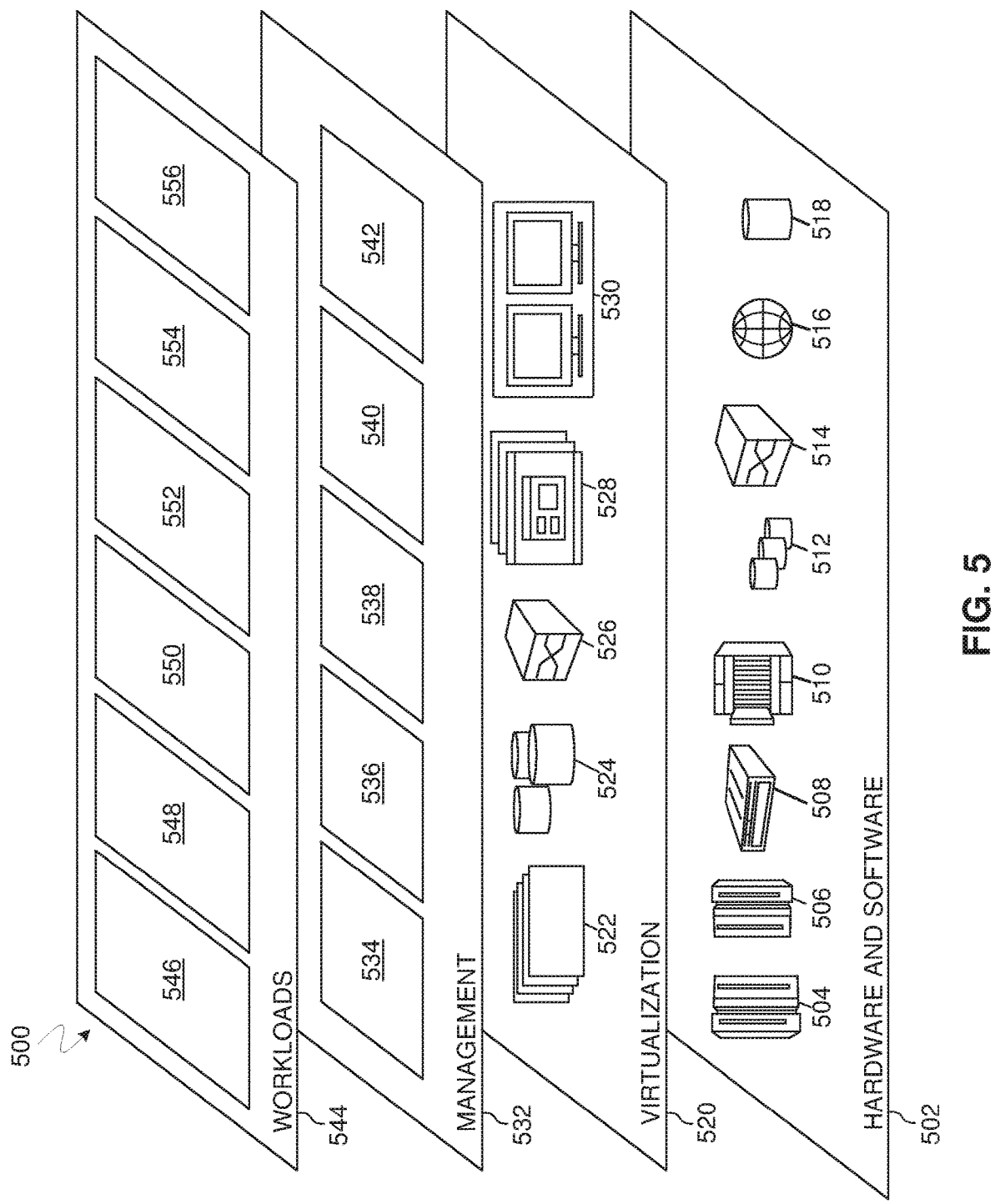
FIG. 5 is a block diagram of functional layers of the illustrative cloud computing environment of FIG. 4, in accordance with an embodiment of the present disclosure.

Referring now to FIG. 5, a set of functional abstraction layers 500 provided by cloud computing environment 4000 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 502 includes hardware and software components. Examples of hardware components include: mainframes 504; RISC (Reduced Instruction Set Computer) architecture based servers 506; servers 508; blade servers 510; storage devices 512; and networks and networking components 514. In some embodiments, software components include network application server software 516 and database software 518.

Virtualization layer 520 provides an abstraction layer from which the following examples of virtual entities may be provided: virtual servers 522; virtual storage 524; virtual networks 526, including virtual private networks; virtual applications and operating systems 528; and virtual clients 530.

In one example, management layer 532 may provide the functions described below. Resource provisioning 534 provides dynamic procurement of computing resources and other resources that are utilized to perform tasks within the cloud computing environment. Metering and Pricing 536 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 538 provides access to the cloud computing environment for consumers and system administrators. Service level management 540 provides cloud computing resource allocation and management such that required service levels are met. Service Level Agreement (SLA) planning and fulfillment 542 provide pre-arrangement for, and procurement of, cloud computing resources for which a future requirement is anticipated in accordance with an SLA.

Workloads layer 544 provides examples of functionality for which the cloud computing environment may be utilized. Examples of workloads and functions which may be provided from this layer include: mapping and navigation 546; software development and lifecycle management 548; virtual classroom education delivery 550; data analytics processing 552; transaction processing 554; and automated virtual meeting presenter automated selection 556. An automated virtual meeting presenter automated selection program 110a1, 110a2, 110a3, 110b, 110c2, 110c2, 110c3 provides a way to automatically and seamlessly switch a presentation computer of a virtual meeting to avoid meeting interference that may arise when one of a team of presenters at different locations experiences broadcast difficulties which may interfere with smooth and clear meeting broadcast to virtual meeting participants such as clients.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises," "comprising," "includes," "including," "has," "have," "having," "with," and the like, when used in this specification, specify the presence of stated features, integers, steps, operations, elements, and/or components, but does not preclude the presence or addition of one or more other features, integers, steps, operations, elements, components, and/or groups thereof.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   receiving a stream of a virtual meeting having a first computer designated for screen sharing control;
   receiving a broadcast hindrance update from the first computer;
   inputting the broadcast hindrance update into a machine learning model;
   receiving as output from the machine learning model a recommendation regarding switching of the screen sharing control; and
   in response to the receiving and to the recommendation indicating that the screen sharing control should be switched, sending a control switching signal to a second computer participating in the virtual meeting.

2. The method of claim 1, further comprising:
   receiving first information regarding other participants of the virtual meeting; and
   determining from the first information and from second information regarding the virtual meeting a backup presenter from the other participants;
   wherein the second computer is for the backup presenter.

3. The method of claim 2, wherein the second information relates to content of the presentation for the virtual meeting.

4. The method of claim 2, further comprising receiving a meeting agenda for the virtual meeting, wherein the second information relates to the meeting agenda.

5. The method of claim 2, further comprising determining a meeting agenda based on contents of the stream of the virtual meeting, wherein the second information relates to the meeting agenda.

6. The method of claim 2, wherein the first information comprises identities of the other participants and at least one member selected from a group consisting of technical familiarity of the respective other participant with content of the virtual meeting, previous presentation experience of the respective other participant, network bandwidth for a respective other computer of the other participant, power of the other respective computer, a background noise level in an area surrounding the other respective computer, available software at the other respective computer, and hardware capabilities of the other respective computer.

7. The method of claim 1, further comprising providing the second computer with a presentation deck that was being used by a designated presenter at the first computer.

8. The method of claim 7, wherein the providing the second computer with the presentation deck comprises generating a dynamic container and transferring the dynamic container to the second computer.

9. The method of claim 7, wherein the presentation deck is provided to the second computer in a same state that the presentation deck exhibited at a time of transfer from the first computer.

10. The method of claim 1, wherein the broadcast hindrance update from the first computer is based on at least one factor selected from a group consisting of network bandwidth for the first computer, power of the first computer, a background noise level in an area surrounding the first computer, available software at the first computer, camera quality of the first computer, microphone quality of the first computer, and hardware capabilities of the first computer.

11. A computer system comprising:
    one or more processors, one or more computer-readable tangible storage media, and program instructions stored on at least one of the one or more computer-readable tangible storage media for execution by at least one of the one or more processors to cause the computer system to:
    receive a stream of a virtual meeting having a first computer designated for screen sharing control;
    receive a broadcast hindrance update from the first computer;
    input the broadcast hindrance update into a machine learning model;
    receive as output from the machine learning model a recommendation regarding switching of the screen sharing control; and
    in response to the receiving and to the recommendation indicating that the screen sharing control should be switched, send a control switching signal to a second computer participating in the virtual meeting.

12. The computer system of claim 11, wherein the program instructions are further for execution by at least one of the one or more processors to further cause the computer system to:
    receive first information regarding other participants of the virtual meeting; and
    determine from the first information and from second information regarding the virtual meeting a backup presenter;
    wherein the second computer is for the backup presenter.

13. The computer system of claim 12, wherein the second information relates to content of the presentation for the virtual meeting.

14. The computer system of claim 12, wherein the program instructions are further for execution by at least one of the one or more processors to further cause the computer system to receive a meeting agenda for the virtual meeting, wherein the second information relates to the meeting agenda.

15. The computer system of claim 12, wherein the program instructions are further for execution by at least one of the one or more processors to further cause the computer system to determine a meeting agenda based on contents of the stream of the virtual meeting, wherein the second information relates to the meeting agenda.

16. The computer system of claim 12, wherein the first information comprises identities of the other participants and at least one member selected from a group consisting of technical familiarity of the respective other participant with content of the virtual meeting, previous presentation experience of the respective other participant, network bandwidth for a respective other computer of the other participant, power of the other respective computer, a background noise level in an area surrounding the other respective computer, available software at the other respective computer, camera quality of the other respective computer, microphone quality of the other respective computer, and hardware capabilities of the other respective computer.

17. The computer system of claim 11, wherein the program instructions are further for execution by at least one of the one or more processors to further cause the computer system to provide the second computer with a presentation deck that was being used by a designated presenter at the first computer.

18. The computer system of claim 11, wherein the broadcast hindrance update from the first computer is based on at least one factor selected from a group consisting of network bandwidth for the first computer, power of the first computer, a background noise level in an area surrounding the first computer, available software at the first computer, and hardware capabilities of the first computer.

19. A computer program product comprising a computer-readable storage medium having program instructions embodied therewith, wherein the program instructions are executable by a computer system to cause the computer system to:
  receive a stream of a virtual meeting having a first computer designated for screen sharing control;
  receive a broadcast hindrance update from the first computer;
  input the broadcast hindrance update into a machine learning model;
  receive as output from the machine learning model a recommendation regarding switching of the screen sharing control; and
  in response to the receiving and to the recommendation indicating that the screen sharing control should be switched, send a control switching signal to a second computer participating in the virtual meeting.

20. The computer program product of claim 19, wherein the program instructions are further executable by the computer system to cause the computer system to:
  receive first information regarding other participants of the virtual meeting; and
  determine from the first information and from second information regarding the virtual meeting a backup presenter;
  wherein the second computer is for the backup presenter.

* * * * *